US009135952B2

(12) United States Patent
Duwenhorst et al.

(10) Patent No.: US 9,135,952 B2
(45) Date of Patent: Sep. 15, 2015

(54) SYSTEMS AND METHODS FOR SEMI-AUTOMATIC AUDIO PROBLEM DETECTION AND CORRECTION

(75) Inventors: Sven Duwenhorst, Hamburg (DE); Martin Schmitz, Braunschweig (DE)

(73) Assignee: Adobe Systems Incorporated, San Jose, CA (US)

( * ) Notice: Subject to any disclaimer, the term of this patent is extended or adjusted under 35 U.S.C. 154(b) by 657 days.

(21) Appl. No.: 12/971,397

(22) Filed: Dec. 17, 2010

(65) Prior Publication Data

US 2014/0289630 A1   Sep. 25, 2014

(51) Int. Cl.
*G06F 3/16* (2006.01)
*G11B 27/00* (2006.01)
*G10L 21/0208* (2013.01)

(52) U.S. Cl.
CPC .............. *G11B 27/00* (2013.01); *G10L 21/0208* (2013.01)

(58) Field of Classification Search
CPC ................................. G11B 27/00; G06F 3/048
USPC ......................................................... 715/727
See application file for complete search history.

(56) References Cited

U.S. PATENT DOCUMENTS

| | | | | |
|---|---|---|---|---|
| 5,857,099 | A * | 1/1999 | Mitchell et al. | 704/235 |
| 8,295,682 | B1 * | 10/2012 | Bhatt | 386/278 |
| 2002/0150220 | A1 * | 10/2002 | Weinman, Jr. | 379/88.13 |
| 2002/0156776 | A1 * | 10/2002 | Davallou | 707/3 |
| 2004/0199277 | A1 * | 10/2004 | Bianchi et al. | 700/94 |
| 2005/0270053 | A1 * | 12/2005 | Chase | 324/763 |
| 2008/0134020 | A1 * | 6/2008 | Adeeb | 715/239 |
| 2009/0144651 | A1 * | 6/2009 | Sprang et al. | 715/800 |
| 2010/0071057 | A1 * | 3/2010 | Plache et al. | 726/17 |
| 2010/0142725 | A1 * | 6/2010 | Goldstein et al. | 381/92 |
| 2010/0195929 | A1 * | 8/2010 | Inoue | 382/274 |
| 2011/0289410 | A1 * | 11/2011 | Paczkowski et al. | 715/716 |

OTHER PUBLICATIONS

"Online Mastering Service from Abbey Road Studios—Frequently Asked Questions" http://www.abbeyroadonlinemastering.com/faq.aspx downloaded from the Internet on Nov. 15, 2010.

* cited by examiner

*Primary Examiner* — Angie Badawi
(74) *Attorney, Agent, or Firm* — Kilpatrick Townsend & Stockton LLP

(57) ABSTRACT

One exemplary embodiment involves receiving identifications of audio problems in a segment of audio and identifications of corrections for applying to attempt to correct the audio problems, wherein the audio problems were identified by a device applying one or more audio problem detection algorithms to the segment of audio. The exemplary embodiment further involves displaying a user interface comprising representations of the audio problems and representations of the corrections and, in response to receiving a command through the user interface to initiate application of a correction of the corrections, initiating application of the correction.

22 Claims, 4 Drawing Sheets

SYSTEMS AND METHODS FOR SEMI-AUTOMATIC AUDIO PROBLEM DETECTION AND CORRECTION

FIELD

This disclosure relates generally to computer software that creates, edits, runs, provides, or otherwise uses audio and video.

BACKGROUND

In audio and video productions, various audio-related problems are manually detected and removed. In audio recordings, for example, system, background and ambient noises are often removed or reduced. System noise can result, for example, from the use of batch transistors, coupled system components, amplification, automatic gain control, and/or other hardware component characteristics. Ambient noises can result from strong winds, recording in a moving vehicle, and other circumstances in which there are surrounding influences. Breath sounds, another type of audio-related problem, may result given a particular speaker's speech characteristics and may be unintentionally amplified in the producing of an audio recording. Other audio-related problems arise as a result of changing recording levels. The recording level may vary, for example, from take to take of a video production, based on differing microphone locations relative to a speaker, and due to various other causes.

Such audio-related problems can be detected and corrected in various ways depending on the type and nature of the noise. Some noise can be detected by analyzing the spectral shape to find a portion of very low noise that is present when nobody is speaking or when a strong signal is not present and then using that as a reference to detect noises that can be removed or reduced consistently or in varying ways throughout an audio recording. Certain noises can be corrected by identifying a fingerprint. For example, if a recording has ventilation noises, a portion of the audio in which such noises are distinct can be selected as a fingerprint that is then used to find and correct similar noises throughout the recording. Correction of audio problems often involves manually identifying a portion of audio, for example, where a breath sound occurs, to make some adjustment, for example, to decrease of level so that the breath sound is not audible. To address differences in level caused by two speakers at different distances from a microphone, a useruser may amplify the recording whenever one of the speakers is speaking Audio problems can also be corrected via a technique sometimes referred to as "colorization" or "equalization" in which a useruser amplifies or reduces certain spectral areas. For example, such a technique may be used when mixing two recordings, where one has rain sounds from surrounding rain.

Audio-related problems are generally manually detected by a useruser listening to an audio stream or audio recording and manually identifying problematic portions. The same or another useruser goes through all those areas and attempts to fix them. Such manual listening, identification, correction processes are time consuming, difficult to speed up, and often involve multiple cycles or iterations. In contrast to manual processes which are often burdensome and time-consuming, automated audio problem detection processes fail to allow sufficient user control of the process. For example, some mastering studios offer web-services to which a useruser can send in audio tracks that are opaquely processed by the company and sent back to the customer. Such services do not allow the user to adequately control the process, for example, by identifying problems that should or not be fixed and/or selection of an appropriate fix for a given problem. Some audio applications have tools for scanning audio and displaying artifacts. However, such tools require significant user interaction and require setting of complex parameters and settings. Generally, existing techniques addressing audio problems generally are excessively time consuming and burdensome, lack adequate user control, or both.

SUMMARY

One exemplary embodiment involves receiving identifications of audio problems in a segment of audio and identifications of corrections for applying to attempt to correct the audio problems, wherein the audio problems were identified by a device applying one or more audio problem detection algorithms to the segment of audio. The exemplary embodiment further involves displaying a user interface comprising representations of the audio problems and representations of the corrections and, in response to receiving a command through the user interface to initiate application of a correction of the corrections, initiating application of the correction.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
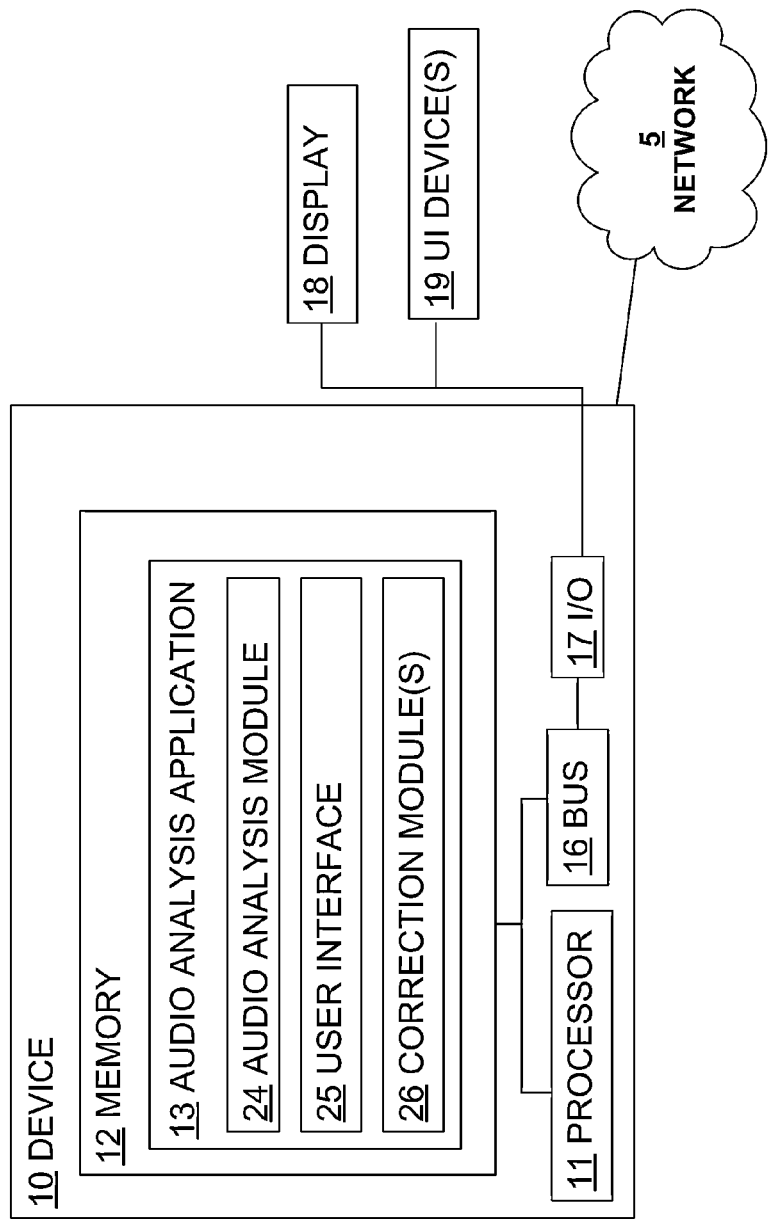
FIG. 1 is a block diagram depicting an exemplary computing device for use in certain embodiments.

Embodiments disclosed herein provide systems and methods that provide semi-automatic processes of detecting and correcting various audio problems. Such methods and systems may analyze audio for potential audio problems, store information about such problems, and/or provide user interface features for displaying and managing the problems and options for automatically and/or manually fixing the problems. In one embodiment, the results of such an analysis of audio to detect potential audio problems are stored in eXtensible Markup Platform (XMP), eXtensible Markup Language, or another declarative language format. Options for fixing the problems may also be identified and stored with or separate from the problems themselves. A user interface may display information about the problems and options for fixing the problems and receive input controlling the application of the proposed fixes. When a fix is applied, the system or method may read the stored information to apply the fix. A system providing such a process can run on a user's local computer or may be provided through a network, for example, as a web-driven service provided through cloud computing technologies. In one exemplary configuration, an analysis is performed on a first device, results are displayed on a second device, and problems are fixed on a third device.

Systems and methods can provide semi-automatic processes for detecting and correcting audio problems with features that provide various benefits. For example, such methods and systems can be configured to simplify a user's audio editing experience so that the user does not have to listen to an entire audio stream or recording. Editing using the methods and systems may not require special skills previously necessary in audio correction processes. The methods and systems may involve a full roundtrip process that allows a user to more simply and more effectively control the analysis and fixing, re-analysis and further fixing, and so on, of audio. A user may be enabled more easily identify erroneous results and filter them out. Aspects of the systems and methods may provide improved, quicker, and/or better measures of audio quality to help a user more quickly identify audio or portions of audio that require re-recording. Audio fixes may be applied on location and re-recordings may be identified as necessary while a user is still on location at a recording location. Systems and methods may use storage techniques that are used by multiple steps of roundtrip workflow, including, as examples, steps to a identify a problem, identify a possible solution, and apply a correction. The storage can be generic such that other tools can interfere at any stage, for example, by using XMP as a transport layer. Features can be easily added even in embodiments providing the audio analysis and corrections processes as a service, for example as a web-driven service provided through cloud computing technologies.

These illustrative examples are given to introduce the reader to the general subject matter discussed here and are not intended to limit the scope of the disclosed concepts. The following sections describe various additional embodiments and examples with reference to the drawings in which like numerals indicate like elements.

Referring now to the drawings, FIG. 1 is a block diagram depicting an exemplary computing device for use in certain embodiments. An exemplary audio editing application 13 that executes on the exemplary device 10 is shown as a functional component. As is known to one of skill in the art, such applications may be resident in any suitable computer-readable medium and execute on any suitable processor. For example, as shown the network device 10 comprises a computer-readable medium such as a random access memory (RAM) 12 coupled to a processor 11 that executes computer-executable program instructions and/or accesses information stored in memory 12. Such a processor 11 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The device 10 may also comprise a number of external or internal devices such as a mouse, a CD-ROM, DVD, a keyboard, a display, audio speakers, one or more microphones, or any other input or output devices. For example, device 10 is shown with a display 18 and various user interface devices 19. A bus, such as bus 16, is included in the device 10. Device 10 could be a personal computing device, a mobile device, or any other types of electronic devices appropriate for providing one or more of the features described herein.

The audio editing application 13 is shown as including an audio analysis module 24, a user interface 25, and one or more correction modules 26 for purposes of illustrating certain features of certain exemplary embodiments disclosed herein. The audio analysis module 24 can generally be used to analyze audio to identify audio problems and may be as simple as an application that provides a waveform display or other visual representation of the audio. The user interface 25 can be used to receive identification of the audio and to provide features that display and/or allow interaction with the results of an audio analysis. The user interface 25 may receive user input, for example through User Interface (UI) devices 19. The one or more correction modules 26 may be controlled by user input of the user interface 25 and may be used to apply a correction to attempt to address one or more audio problems identified by the audio analysis module 24.

In an alternative embodiment, audio editing functionality is provided through one or more services available through a network. One such exemplary system comprises a server that provides a web page interface that a user can use to upload audio to the server. The system receives the audio, analyzes it, and provides results, for example, for display in a web page to the requesting user. The user can view the web page or the otherwise-presented results and identify one or more corrections for application. The corrections may be applied locally at the user's local computing device or via a remote service. For example, one or more of the requested corrections can be requested to be performed on the server that provided the results or another network server. After application of the one or more corrections, the system may provide the corrected audio and/or re-analyze the corrected audio for possible continuing or new audio errors. Ultimately, through one or more iterations of such an analyze, select correction, application correction workflow, the user receives a finally corrected version of the audio that is useable for the user's intended purpose or that is otherwise acceptable to the user.

Figure 2:
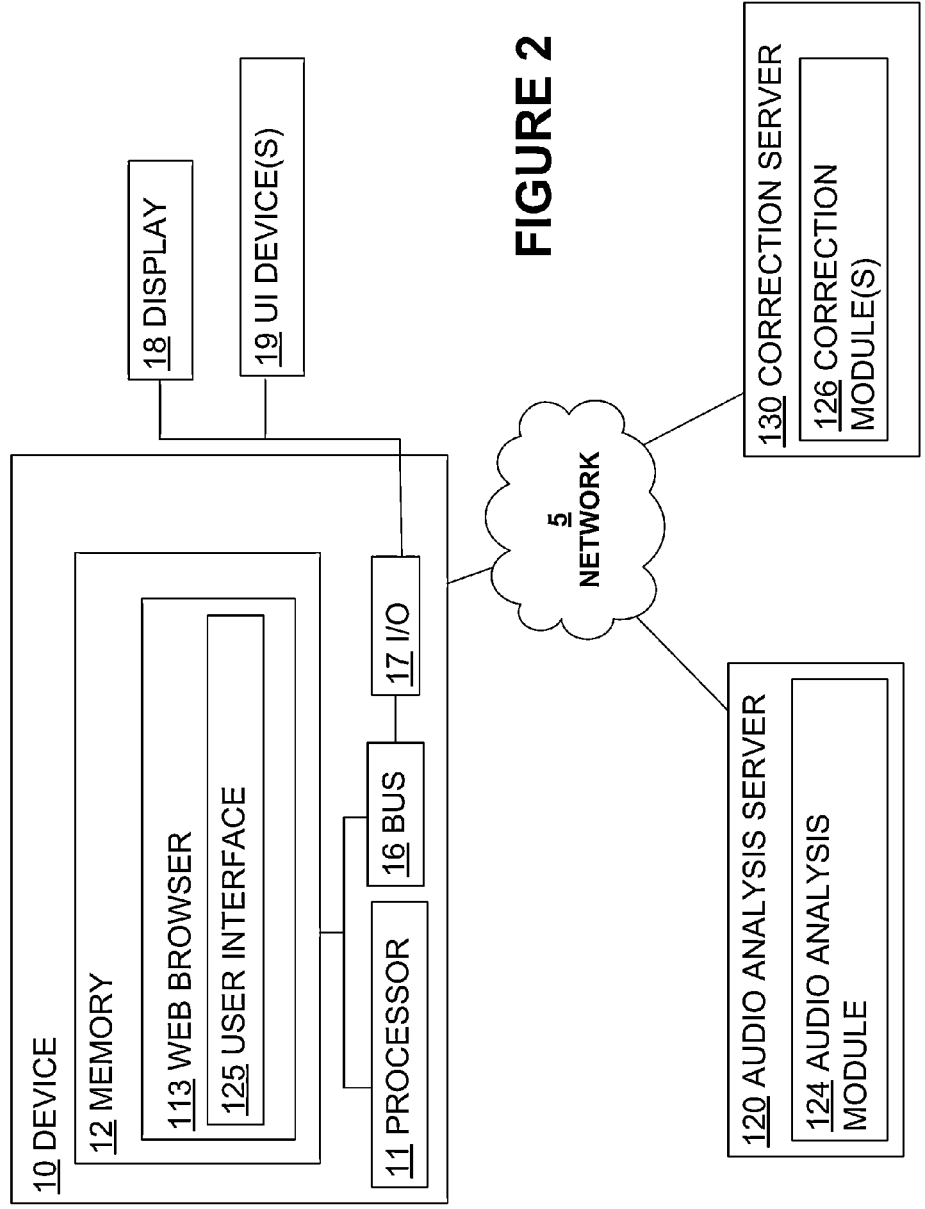
FIG. 2 illustrates an exemplary system providing audio editing functionality through one or more services available through a network.

FIG. 2 illustrates another exemplary system providing audio editing functionality through one or more services available through a network 5. In FIG. 2, the device 10 includes a web browser 113 that accesses an audio analysis module 124 on an audio analysis server 120 to perform an audio analysis. For example, a segment of audio may be sent from device 10 to device 120 for analysis by the audio analysis module 124, and results of the analysis may be sent back to device 10 for display in a user interface 125 provided through the web browser 113. Thus, the results may be formatted as web page or rich Internet application or part thereof for display in the web browser 113. The user interface 125 may present the results with one or more selectable options for applying corrections to address audio problems identified in the results. Selection of a correction options, may cause the segment of audio to be sent from device 10 to correction server 130 where correction module(s) 126 apply the selected corrections. The corrected audio is sent back to device 10 for further use. Multiple audio analysis servers and/or correction servers may be used to distribute functionality in multiple places or to achieve other benefits. Middleware or other software can be used to assign and manage tasks across such multiple servers.

Figure 3:
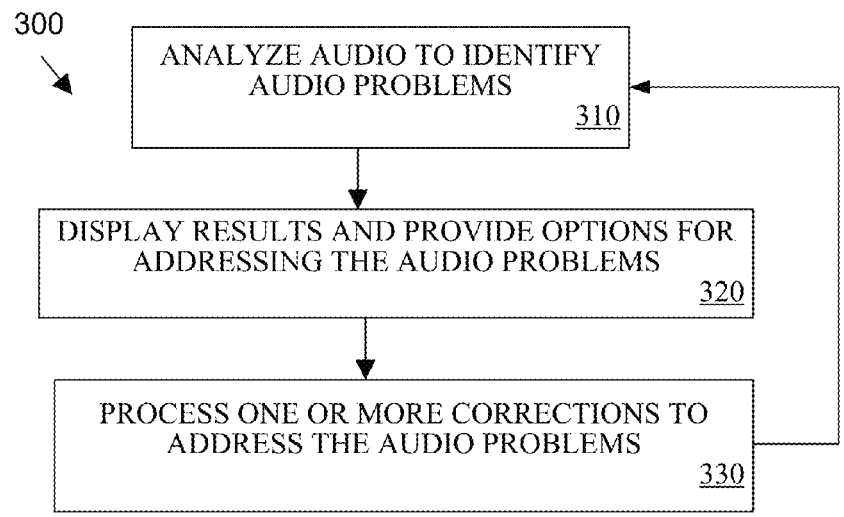
FIG. 3 is a flow chart illustrating an exemplary method of managing audio.

FIG. 3 is a flow chart illustrating an exemplary method 300 of managing audio. The exemplary method 300 involves the three steps. The first step involves analyzing audio to identify audio problems, as illustrated in block 310. The second step involves displaying results and providing options for addressing the audio problems, as shown in block 320. The third Step involves processing one or more corrections to address the audio problems, as shown in block 230. After processing the one or more fixes the exemplary method 300 can return to step 310 to again analyze the audio to identify audio problems.

Figure 4:
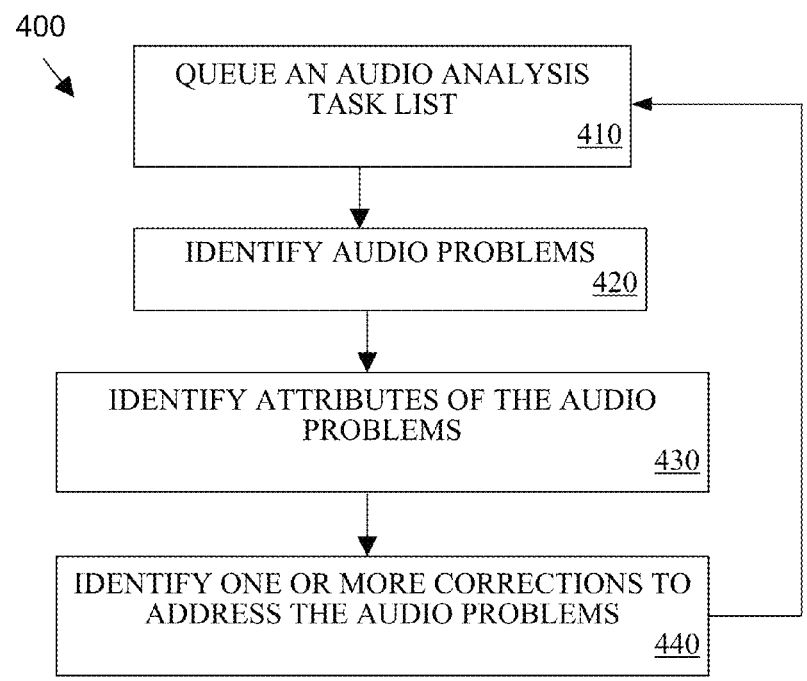
FIG. 4 is a flow chart illustrating an exemplary method of analyzing audio to identify audio problems.

FIG. 4 is a flow chart illustrating an exemplary method 400 of analyzing audio to identify audio problems, for example, as might be performed by the analyzing audio to identify audio problems step 310 of FIG. 3. The method 400 may be performed on a user's local computing device or by a remote network device. Analyzing audio to identify audio problems may be performed by the audio analysis module 24 of FIG. 1, audio analysis module 124 of FIG. 2, or by any other suitable module, system, or combination of one or more devices. Analyzing audio can be performed as a service that processes requests received from one or more remote users or devices to analyze provided or otherwise identified audio to identify audio problems in the audio.

The exemplary method 400 begins with the queuing of an audio analysis task, as shown in block 410. If locally performed, an analyzer task is queued for the audio that is to be analyzed. If remotely performed, the audio is sent as a file or streamed to the remote analyzer computer where the analyzer task has been queued. An analyzer task is an algorithm or other process of analysis for a given segment of audio. A work queue can be used to receive and prioritize multiple audio analyzing tasks for one or more pieces of audio.

The exemplary method 400 next identifies an audio problem, as shown in block 420. Thus, after an audio analysis task is taken from the queue, the method 400 can use one or more of various available algorithms to detect audio problems. Generally, such algorithms involve scanning the audio by reading it from disk or queuing the input node of a streaming client and processing the information read from the disk or in the audio stream to identify problems. A problem may be identified, for example, where an aspect of the data exceeds particular thresholds or otherwise has a particular characteristic that can be interpreted as an indication of the existence of an audio problem. In one embodiment, for each audio problem that is detected, an event is added to an output list associated with the task.

The exemplary method 400 further identifies attributes of the audio problem, as shown in block 430. In one embodiment, audio output events are added to an output list associated with the task and, for each audio problem that is included, a description containing information about the audio problem, such as its time, location, range and description is added. An example of information about time is an identified time position within the audio, e.g., identifying that an audio problem occurs or begins one minute and thirty seconds after the beginning of the audio. An example of information about location could identify a particular channel or channel associated with a problem, e.g., identifying that the audio problem occurs in the left channel, the right channel, or both. Attribute information may identify a frequency associated with an audio problem. An example of range or duration information is an identification of a particular time range within the audio in which the audio problem is present, e.g., identifying a 20 seconds period within the audio at which the audio problem occurs.

Each algorithm used in an analysis to detect audio problems may have a unique identifier, for example, an arbitrary string or number. Assigning a unique identifier, such as a 128 bit unique identifier, to a problem can facilitate tracking such a problem through various systems and contexts. In one exemplary embodiment, audio problem event information may be stored with information that identifies the analyzer, a timestamp (e.g., identifying a location in media), a range, a description of the found problem (e.g., a name of the problem), a parameter list of attributes describing the problem in a computer readable form (e.g., comprising a vector of floats, unit dB, linear scale), and a unique identifier for a processor to correct the problem. The unique identifier for a processor to correct the problem can, in one example, simply point to a tree or graph-type of structure that lists or otherwise identifies various other unique identifiers of processors to correct the problem. Information about the audio problems can be stored or otherwise formatted in an extensible format so that, as an example, new analysis and correction algorithms can easily be referenced without requiring that the format of a message or storage structure used to provide information about such audio problems change format. The format may be an eXtensible Markup Language-based (XML-based) format, such as an eXtensible Metadata Platform (XMP) format.

In one embodiment, referenced algorithms are implemented as plug-in modules that can be commonly referenced and used by simply specifying an identifier and parameters appropriate for the given algorithm using a format that is commonly used to specify the use of any existing or future plug-in. An analysis of audio to identify audio problems may combine various algorithm results to identify a correction that would not have been identified by the individual algorithms. For example, a combination of plug-ins may be identified as appropriate to address one or more particular audio problems.

Attributes and corrections may be specific to a particular type of problem. For example, for a system hiss audio problem, the analysis may detect the presence and amount of the hiss and a correction could be identified providing a correcting filter with particular settings (e.g., a spectral power, a vector of floats (dB), etc.). For background or ambient noise that includes wind or traffic noise, the analysis may simply detect the presence and amount of the audio problem. For breath sounds, the analysis may detect the presence, time, range, and provide a confidence estimate. For level change audio problems, the analysis may detect an overall level and identify a level change over time (RMS) and a dynamic range. For microphone movement triggered audio problems, the analysis may detect the problem and identify the channel associated with the microphone. For audio problems corrected via colorization, the analysis may detect a spectral balance and suggest a correction of a correcting filter with particular settings (e.g., a spectral power, a vector of floats (dB), etc.).

Since detection of an audio problem can involve differing levels of confidence regarding the existence of an audio problem, the information about an audio problem can include a value that represents confidence, e.g., identifying that there is an estimated 70% chance or likelihood that a particular segment of the audio includes a breath sound audio problem. Similarly, a detected audio problem can be associated with an estimate of problem strength, e.g., identifying that a background noise problem is mild or severe, etc.

The exemplary method 400 further identifies one or more corrections to address the audio problems, as shown in block 440. Such corrections may be identified in a variety of ways. For example, a correction may be identified by accessing a database that includes data records correlating a given type of audio problem to a given correction type, and/or information correlating attributes of an audio problem to settings associated with a particular correction. For example, a severe background noise audio problem may be associated with a particular correction applied under a first set of settings while a mild background noise audio problem may be associated with the same or a different correction applied under a second set of settings. A given audio problem may have multiple possible corrections that can be applied individually or in combination.

Analysis of audio using one or more algorithms can occur in parallel. For example, an audio stream may be replicated and sent to multiple algorithm in parallel. In addition, algorithms used in the analysis of audio may collaborate with one another. If, for example, one algorithm identifies a particular audio problem or other feature of interest to another algorithm that can use that information. The analysis can facilitate such collaboration by sequencing the use of algorithms, delaying algorithm use, or otherwise as may be appropriate. In a particular example, if one algorithm is computing audio level, a second algorithm that is applied after the first one may be delayed to allow processing of a larger window of time to allow further or more detailed analysis. In one embodiment, the results of an audio problem analysis can be graphed to visually represent relationships between audio problems detected by multiple algorithms. Such a graph may be used to manually or automatically identify an algorithm or combination of algorithms that will potentially best correct the audio problems.

After identifying one or more corrections, the method 400 may return to the block 410 to begin processing another audio analysis task. The audio problems, attributes, and one or more corrections can be provided for use by a user in further managing the correction. For example, in the method of FIG. 1, such audio problems, attributes, and one or more corrections and/or any other appropriate information may be provided from the analyzing audio to identify audio problems step of block 310 to the display results and provide options for addressing the audio problems step of block 320. Information returned from an analysis to identify audio problems can include markers within the audio itself. For example, metadata can be added to an audio file with audio problem identification information.

Such results and options can be provided prior to the completion of the analysis of a particular segment of audio. Results and/or options can be provided to present progress information and/or partial results. Preliminary feedback may reveal or suggest whether the audio is going to have only a few problems or a significant number of problems, or if the audio is going to have particular problems or problems in particular areas. Such preliminary feedback can be particularly useful to notify a user that a segment of audio or portion of the audio will likely need to be rerecorded or simply discarded. Preliminary feedback may provide timely information in sufficient time to allow a user to initiate rerecording or recapturing of the audio, for example, after modifying the sound capturing conditions to eliminate the source of a particular problem identified in the preliminary feedback, e.g., by closing a door to eliminate or reduce a background sound. A user may additionally or alternatively use preliminary feedback to estimate how much time and cost will be required to correct the audio.

Results and correction options from an analysis of audio can be provided in various ways. In one exemplary context, a client device receives a list of events identifying and describing audio problems within the audio. A user interface may present such a list by simply providing text identifying the problems and possible corrections. A timeline or other time indications may be provided with such a text-based display. Additionally or alternatively a user interface may display a wave form that identifies the results. Individual audio problems may be identified with markers, using different colors, or otherwise distinguished from one another. The displayed results and/or corrective options may be interactive so that a user can select an audio problem item and focus on or obtain more information about a particular audio problem. Selection of a particular problem may initiate playback of the associated portion of the audio containing the audio problem. Accordingly, the display and user interface of results may provide a convenient and beneficial interface for visualizing and navigating amongst the audio problems and the associated audio. The analyzed audio may be part of a piece of media that comprises other audio and/or video and may involve audio that has one or multiple channels. Thus, a correction may be selectively applied within only a particular context, for example, only to a particular channel or channels of the audio.

A user interface may also display corrections as proposals for fixing one or more audio problems. The user interface may receive input that initiates use of the corrections individually, in suggested or user-identified groups, or of all proposed corrections. After the corrections are applied, the user interface may allow application of additional corrections. After a correction is applied, the audio may be reanalyzed, automatically or based on user input, to determine whether the correction was successful and/or to identify audio problems remaining in the audio after the corrections. For example, the user interface may allow a user to listen to and compare a pre-correction version to a post-correction version of the audio. Alternatively, the user interface may allow the user to listen only to the post-correction version of the audio.

In one exemplary embodiment, a user interface presents information about audio problems that generally helps a user identify whether to correct or ignore each identified audio problem. Certain types of audio problems may occur frequently and a user interface may allow a user to create rules so that some audio problems are corrected or ignored automatically. The user interface may thus enable a user to focus on audio problems that will require the user's attention while automatically correcting or ignoring problems that the system or user has specified to be automatically corrected or ignored. For example, a user may specify that mild breath sounds are to be automatically corrected and that mild wind noise is to be ignored. The user interface can thus provide an efficient means for a user to consider and make determinations with respect to correction of the audio problems that are estimated to be of the most interest to the user.

Figure 5:
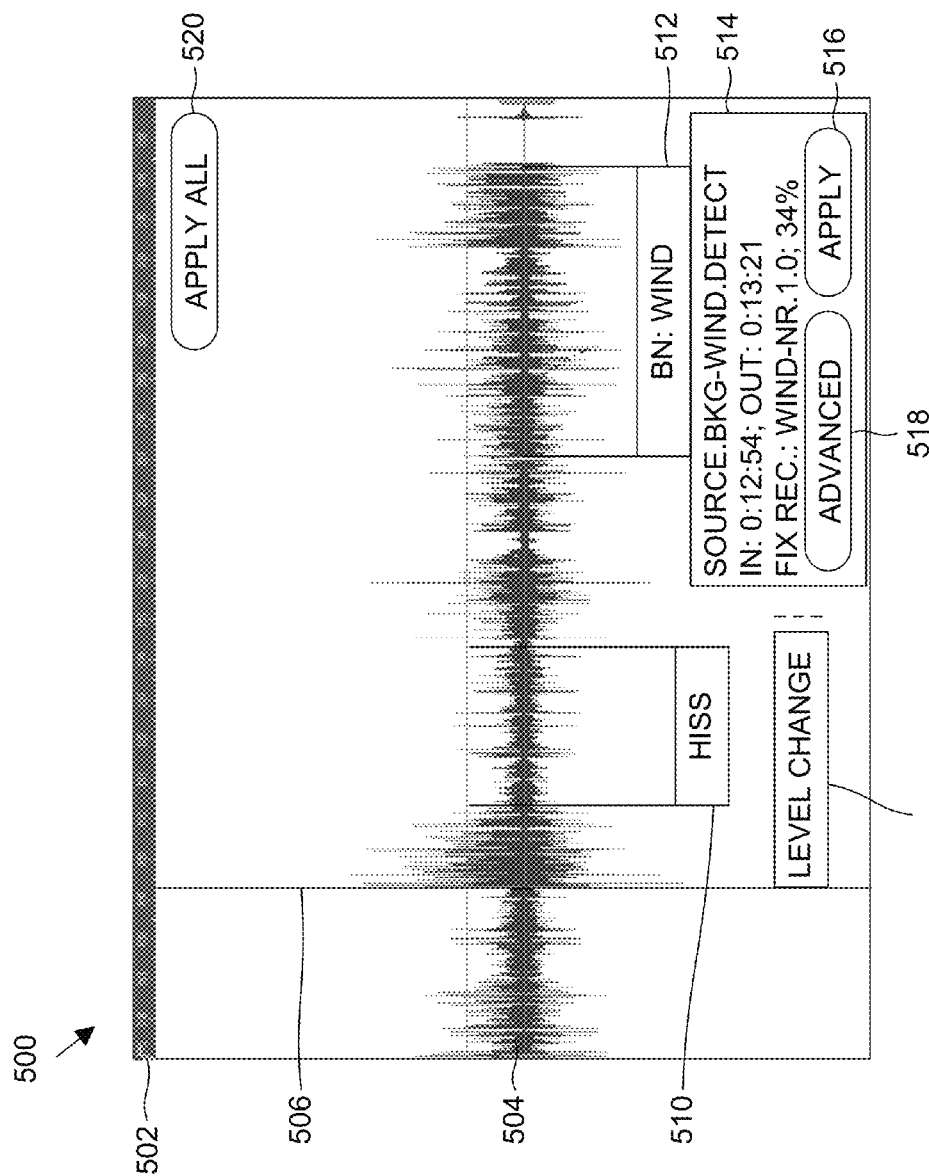
FIG. 5 is a screen shot of a display of a device illustrating an exemplary user interface for displaying results of an audio analysis.

FIG. 5 is a screen shot of a display of a device illustrating an exemplary user interface 500 for displaying results of an audio analysis. The interface includes a timeline 502 and displays a waveform 504 for the audio that was analyzed. The user interface 500 further allows a user to select an identified audio problem to obtain additional information or to listen to audio portion associated with selected audio problem. For example, as shown, a level change audio problem has been selected by selection of audio problem marker 508 and the current position cursor 506 is positioned at the beginning of that audio problem. The current position cursor 506 can be jumped from audio problem marker to audio problem marker based on selection of a particular audio problem marker in the user interface 500.

The exemplary user interface further displays an audio problem marker 510 indicating an identified hiss audio problem and an audio problem marker 512 indicating an identified background noise wind audio problem. The user interface further displays a window 514 with text describing additional information. In this example, the information includes the text "SOURCE.BKG-WIND.DETECT" uniquely identifying the algorithm that was applied to identify the audio problem, the text "IN: 0:12:54" identifying the starting time of the audio problem, the text "OUT: 00:13:21" identifying the ending time of the audio problem, and the text "34%" identifying the confidence that the audio condition is actually present. The window further comprises text describing a correction option recommended for the identified background noise wind audio problem. In this example, the text "FIX REC.: WIND-NR.1.0" identifies the correction option. The window 514 provides a selectable button 516 for initiating the proposed correction, that is, the correction identified by the text "FIX REC.: WIND-NR.1.0" in the window 514. The window 514 further provides button 518 for accessing advanced information and options for the background noise wind audio problem. The user interface also provides an apply all button 520 for applying the recommendation options associated with all of the audio problems for which audio markers are displayed, that is, for the audio problems associated with the audio problem markers 508, 510, 512 in the example of FIG. 5.

One exemplary embodiment provides a user interface that allows a user to manually select audio problem events for correction. In response to such input, corrections are applied to the audio. A unique identifier for a particular correction type or correction processor may be identified and used to initiate an appropriate correction algorithm. The correction may apply an appropriate effect or filter and may use parameters identified during the automatic problem analysis and/or manually-specified parameters. In one embodiment, a user interface identifies default parameter values for a correction based on an audio problem analysis and then receives manual adjustments to the default parameters. An analysis system may infer user preferences used to identify one or more parameters for the corrections applied by the system. For example, the system may recognize that a particular user always or commonly uses particular settings to fix particular types of audio problems and may make those recognized settings default parameters.

One embodiment provides a semi-automatic audio correction process in which audio problems are identified automatically and at least some manual selections of corrections are received to initiate corrections of certain or all of the identified problems. Since the applied corrections may not guarantee correction of a problem, the process may iterate multiple times to ensure that the audio problems are addressed to an appropriate degree. In one exemplary embodiment, the process iterates and receives manual selection of corrections in each iteration. In another exemplary embodiment, the system receives manual selections of corrections in a first pass and then automatically applies corrections in the second pass and subsequent passes thereafter.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alter- That which is claimed:

1. A computer-implemented method comprising:
receiving identifications of audio problems in a segment of audio and a plurality of identifications of corrections for applying to attempt to correct the audio problems, wherein each correction addresses one of the identified audio problems, wherein the audio problems were identified by a device applying one or more audio problem detection algorithms to the segment of audio by scanning the audio read from a disk, each audio problem detection algorithm associated with a distinct audio problem algorithm identifier and identifying a distinct audio problem;
displaying a user interface comprising representations of the audio problems and representations of the corrections;
storing audio problem event information for each audio problem identified in the audio problems, the audio problem event information comprising, for each distinct audio problem, the distinct audio problem algorithm identifier identifying the distinct audio problem, a timestamp, and an audio problem description; and
in response to receiving a command through the user interface to initiate application of a correction of the corrections, initiating application of the correction.

2. The method of claim 1 further comprising receiving a selection of a representation of an audio problem and initiating audio playback of a portion of the segment of audio based on the selection.

3. The method of claim 1 wherein the identifications of the audio problems identify times the audio problems occur in the segment of audio, and wherein the representations of the audio problems identify the times the audio problems occur.

4. The method of claim 1 wherein the user interface displays the representation of the audio problems are displayed relative to time on a visual representation of the segment of audio to identify times the audio problems occur in the segment of audio.

5. The method of claim 1 wherein the command initiates corrections of all of the audio problems using the corrections.

6. The method of claim 1 wherein further comprising:
receiving a corrected segment of audio comprising the segment of audio after application of the correction;
receiving identifications of second pass audio problems in the corrected segment of audio and identifications of second pass corrections for applying to attempt to correct the second pass audio problems, wherein the second pass audio problems were identified by the device applying the one or more audio problem detection algorithms to the corrected segment of audio;
displaying the user interface comprising representations of the second pass audio problems and representations of the second pass corrections; and
in response to receiving a second pass command through the user interface to initiate application a second pass correction of the second pass corrections, initiating application of the second pass correction.

7. The method of claim 1 further comprising:
receiving correction parameters with the identifications of corrections, wherein the correction parameters were identified by the device applying the one or more audio problem detection algorithms to the segment of audio;
receiving, at the user interface, modifications to the parameters; and
applying the correction using the parameters as modified by the modifications.

8. The method of claim 1 further comprising identifying one or more of the audio problems for automatic correction based on user preferences, wherein the representations of the audio problems do not represent the one or more audio problems for automatic correction.

9. The method of claim 1, wherein at least one of the audio problems is selected from the group consisting of breath sounds, hiss, background noise, ambient noise, level changes, microphone movement, colorization correctable problems, and microphone problems.

10. The method of claim 1 further comprising updating a setting associated with at least one correction parameter based at least in part on a user preference.

11. The method of claim 1 further comprising updating a setting associated with at least one correction parameter based at least in part on a user preference, wherein the setting was selected by a user of the plurality of users to fix a type of audio problem.

12. A system comprising:
one or more processors; and
memory coupled to the one or more processors and configured to store program instructions which, upon execution, cause the system to:
analyze audio to identify audio problems by applying one or more audio problem detection algorithms to a segment of audio, the one or more audio problem detection algorithms each identifying a distinct audio problem by scanning the audio read from a disk, each audio problem detection algorithm associated with a distinct audio problem algorithm identifier;
identify corrections for applying to attempt to correct the audio problems, each correction being a correction to one of the audio problems;
store audio problem event information for each audio problem identified in the audio problems, the audio problem event information comprising, for each distinct audio problem, the distinct audio problem algorithm identifier identifying the distinct audio problem, a timestamp, and an audio problem description;
display, via a user interface, representations of the audio problems and representations of the corrections, wherein the user interface is further configured to initiate application of a correction in response to receiving a command to initiate application of the correction; and
apply corrections in response to initiation of the corrections made via the user interface.

13. The system of claim 12 wherein analyzing the audio occurs on a server separate from a device that displays the user interface, the segment of the audio received from the device, and the identifications of audio problems and the identification of corrections being provided to the device.

14. The system of claim 12 wherein analyzing the audio to identify audio problems, displaying representations of the audio problems and representations of the corrections, and applying the corrections each occur on separate devices.

15. The system of claim 12 wherein the user interface is configured to receive a selection of a representation of an audio problem and, in response, initiate audio playback of an associated portion of the segment of audio.

16. The system of claim 12 wherein analyzing the audio provides the identifications of audio problems and the identifications of corrections in a common format for multiple types of audio problems.

17. The system of claim 16 wherein the common format allows for inclusion of an identifier that identifies an algorithm applied to identify an audio problem.

18. The system of claim 16 wherein the common format allows for inclusion of an identifier of an audio problem, wherein the identifier allows the audio problem to be identified through multiple attempts to correct the audio problem.

19. The system of claim 16 wherein the common format allows for inclusion of an identifier of a filter for applying to attempt to correct an audio problem and parameters for the filter.

20. The system of claim 16 wherein the common format is an eXtensible Markup Language-based (XML-based) format.

21. A non-transitory computer-readable medium on which is encoded program code, the program code comprising:
  program code for receiving identifications of audio problems in a segment of audio, wherein the audio problems were identified by a device applying one or more audio problem detection algorithms to the segment of audio, the one or more audio problem detection algorithms each identifying a distinct audio problem by scanning the audio read from a disk, each audio problem detection algorithm associated with a distinct audio problem algorithm identifier and identifying a distinct audio problem;
  program code displaying a user interface comprising a visual representation of the segment of audio and indicators for portions of the segment of audio that have the audio problems, the indicators each indicating a type of problem and selectable to initiate application of a correction to address an associated audio problem of the audio problems;
  program code for storing audio problem event information for each audio problem identified in the audio problems, the audio problem event information comprising, for each distinct audio problem, the distinct audio problem algorithm identifier identifying the distinct audio problem, a timestamp, and an audio problem description; and
  program code in response to receiving a command through the user interface to initiate application a correction, initiating application of the correction.

22. The computer-readable medium of claim 21 further comprising program code for receiving identifications of the corrections for applying to attempt to correct the audio problems.

* * * * *